3,236,792
WATER-DISPERSIBLE FORM OF DIALDEHYDE POLYSACCHARIDES AND PROCESS THEREFOR
James Huey Curtis, Elkhart, Ind., assignor to Miles Laboratories, Inc., Elkhart, Ind., a corporation of Indiana
No Drawing. Filed Dec. 12, 1963, Ser. No. 329,948
10 Claims. (Cl. 260—17.3)

This invention relates to a form of dialdehyde polysaccharides which is soluble in water at room temperature and to a process of preparing such material. More particularly, this invention relates to a spray dried composition of the reaction product between a dialdehyde polysaccharide, a hypochlorite oxidized polysaccharide and a condensation product of dicyandiamide and formaldehyde.

Dialdehyde polysaccharides are well known in the art. Such materials are frequently referred to as periodate oxidized polysaccharides because of their preparation by the well known oxidation of polysaccharides with periodic acid. This preparation can be illustrated by the conversion of a polysaccharide, such as starch, to dialdehyde starch or periodate oxidized starch using periodic acid in accordance with the following equation:

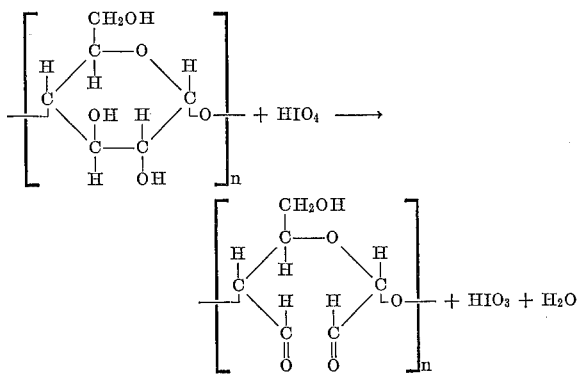

wherein $n$ stands for the number of repeating structural units in the molecule, which may range from as few as about 20 to as many as several thousand. The preparation of dialdehyde starch is more particularly described in U.S. Patents No. 2,648,629 of W. Dvonch et al. and No. 2,713,553 of C. L. Mehltretter. It is also known that the dialdehyde polysaccharides are quite insoluble in water, especially cold or room temperature water. Since these materials are generally employed in aqueous applications, they must be appreciably dissolved or intimately dispersed in aqueous media. Various techniques have been employed in the prior art to disperse the dialdehyde polysaccharides and thus increase their water solubility. It is also known that dialdehyde polysaccharides are useful to improve the wet tensile strength of cellulosic paper. However, a cationizing or coupling agent must be employed to aid in bonding the dialdehyde polysaccharide to the paper or paper pulp. These cationizing agents can be added to the paper or paper pulp prior to contacting the so-treated paper or paper pulp with an aqueous dispersion of dialdehyde polysaccharide. Alternatively, the aqueous dispersion of the dialdehyde polysaccharide can be mixed with the cationizing agent prior to contacting the paper or paper pulp. In either case the difficult step of first dispersing the dialdehyde polysaccharide must be completed before contact with the cationizing agent can be made. Such prior art techniques have the disadvantage of requiring a separate cationizing agent with the attendant supply and mixing problems.

It is a principal object of the present invention to provide a form of dialdehyde polysaccharides which is readily soluble in water at room temperature.

It is another object to provide a form of dialdehyde polysaccharides which requires no separate cationizing agent.

The novel compounds of the present invention comprise the finely-divided solidified reaction products of from about 70 to about 85 parts by weight dialdehyde polysaccharides wherein from about 0.5 to about 100 units out of 100 of the original anhydroglucose units of the polysaccharides have been oxidized to dialdehyde units represented by the formula:

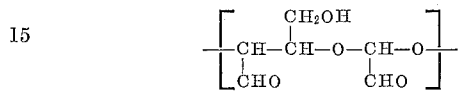

from about 7.5 to about 15 parts by weight hyperchlorite oxidized polysaccharides, and from about 7.5 to about 15 parts by weight of a condensation product of dicyandiamide and formaldehyde. Preferably the compounds of the present invention are formed from dialdehyde polysaccharides which are from about 90 to about 100 percent oxidized. The preferred compounds contain about 70 parts by weight dialdehyde polysaccharides, about 15 parts by weight hypochlorite oxidized polysaccharides and about 15 parts by weight of a condensation product of dicyandiamide and formaldehyde. In addition, the preferred finely-divided solidified products are spray-dried.

The dialdehyde polysaccharides to be used as starting materials to prepare the novel compounds of the present invention may be the dialdehyde derivatives of any polysaccharide, such as corn, wheat, rice, tapioca or potato starches, amyloses, amylopectins, celluloses, gums, dextrans, algins, inulins and the like. Of these polysaccharides, the dialdehyde derivatives of starch known generically as dialdehyde starch are the best known and most widely used. However, where it is desired to have dialdehydes of other polysaccharides, these may be used as well. The dialdehyde polysaccharides useful in the present invention can be from about 0.5 to about 100 percent oxidized, i.e., those wherein about 0.5 to about 100 of each 100 of the original anhydroglucose units have been converted to dialdehyde units such as by periodate oxidation as above described. In general, it is preferred to use dialdehyde polysaccharide derivatives which are from about 90 percent to 100 percent oxidized.

The hypochlorite oxidized polysaccharides to be used as starting materials to prepare the novel compounds of the present invention are well known in the art and are prepared by well-known procedures, such as treatment of starches with alkaline hypochlorite salts.

The condensation products of dicyandiamide and formaldehyde useful as starting materials in preparing the novel compounds of the present invention are well known in the art. Generally such condensation products are prepared by mixing dicyandiamide, formaldehyde and catalyst, such as ammonium chloride, and allowing the exothermic reaction to heat the mixture to about 65–100° C. The dicyandiamide-formaldehyde condensation product preferably employed in the present invention is prepared by forming an aqueous slurry of 1.5–2.0 moles of formaldehyde and 1 mole of dicyandiamide, adding stepwise to the slurry 0.3 to 0.6 mole of a catalyst, such as ammonium chloride, in amounts to maintain the temperature of the reaction mixture below about 70° C. and to maintain the pH of the reaction mixture initially between about 1.0 and about 2.5 and upon completion of the reaction between about 2.5 and about 3.5, carrying out the reaction at a temperature below about 70°

C. and pH below about 3.5 until a water-soluble reaction product having an average molecular weight of about 500 to about 700 is obtained, and then cooling the reaction product to room temperature. Upon standing at room temperature the pH of the reaction mixture will gradually increase within about 2 hours to about 3.8–4.2.

The novel compounds of the present invention are prepared by the process of mixing in water about 70 to about 85 parts by weight, preferably about 70 parts by weight, dialdehyde polysaccharides, from about 7.5 to about 15 parts by weight, preferably about 15 parts by weight, hypochlorite oxidized polysaccharides and from about 7.5 to about 15 parts by weight, preferably about 15 parts by weight, of a condensation product of dicyandiamide and formaldehyde to form a slurry containing about 15 to about 25 weight percent solids, heating the slurry with stirring to about 90–100° C., maintaining the slurry at about 90–100° C. with stirring for about 5 to 15 minutes until the dispersion of the solid material is complete, cooling the dispersion to about 70° C., adjusting the pH of the dispersion to about 4–5.5 and then drying the dispersion, preferably by spray-drying, and collecting the finely-divided solidified product. Preferably the dispersion temperature is about 95–97° C. Preferably the pH of the dispersion is adjusted to about 4.3–4.5 before spray-drying. If the highly acid dispersion obtained by the above process is not adjusted to the above proper pH values before spray-drying, the resulting spray-dried solid product is not easily redispersible in water at room temperature. The pH is adjusted by well-known techniques, such as adding minor amounts of sodium hydroxide, sodium carbonate, borax, dibasic sodium phosphate, and the like. Typical spray-drying techniques and apparatus are employed in spray-drying the above prepared dispersion. The alkalinity of the water employed to prepare the dispersions is not critical in the present invention whereas the prior art dispersion processes were quite sensitive as to the alkalinity of the water.

The product obtained by the above described process is a substantially free-flowing powder which is easily dispersed by simple mixing in water at room temperature. The alkalinity of the water is not critical. The resulting dispersion is cationic and readily couples to paper or paper pulp to aid in improving the dry and wet tensile stengths of the so-treated paper or paper resulting from the treated paper pulp. This powder product is a distinct improvement over solidified dialdehyde polysaccharides obtainable in the prior art since the prior materials were not per se dispersible in water at room temperature and were not per se cationic.

The process of the present invention is also a distinct improvement over the prior art since higher solids content can be employed in the dialdehyde polysaccharide slurry without gel formation. The time at dispersion temperature of about 5–15 minutes is substantially less than the 40 minutes generally used by the prior art to disperse the dialdehyde polysaccharides alone. This feature enables the dispersion process, which was a batch technique in the prior art, to become a substantially continuous process, if desired. The present process has an additional advantage. When the reaction mixture slurry is heated to dispersion temperature, the aldehyde polysaccharides and the hypochlorite oxidized polysaccharides pass directly from the solid phase to a liquid dispersed phase without passing through a swelling phase. The lack of swelling, which is always present with prior art dialdehyde polysaccharide materials, enables equipment of smaller volume to used for dispersion.

The invention is further described in the following examples.

*Example I*

To a 30 liter stainless steel kettle fitted with a steam and water jacket were charged 20 liters of tap water and 0.6 kg. of dicyandiamide-formaldehyde condensation product prepared in accordance with the preferred procedure. This mixture was stirred about 3 minutes. To this were added 2.8 kg. of dialdehyde corn starch (containing 9–10 weight percent moisture and about 90–98 percent oxidized) and 0.6 kg. of hypochlorite oxidized corn starch (Douglas Clearsol Gum, grade W, sold by Penick & Ford, Ltd.). The resulting slurry was stirred for about 3 minutes. The reactants were employed in the ratio of 70 weight parts dialdehyde starch, 15 weight parts hypochlorite oxidized starch and 15 weight parts condensation product of dicyandiamide and formaldehyde. Steam was then introduced to the kettle jacket and the stirring was continued. In about 10 minutes the slurry reached the desired temperature of 95° C. The temperature was maintained at this value for 15 minutes after which time the dispersion was complete. The dispersion was then cooled to about 70° C., the pH adjusted to 4.3 and then passed into a spray drier having an inlet temperature of about 177° C. and 77° C. outlet temperature. The spray-dried product was collected in plastic bags.

The utility of the above product is shown in the following example.

*Example II*

A 50 g. portion of the product obtained in Example I was added to 950 ml. of distilled water at 26°–28° C. and stirred until the finely-divided material was thoroughly dispersed or dissolved (about 15 minutes). A portion of this cationic dispersion was added to a bleached cellulosic kraft pulp beaten to a Canadian standard freeness of 450 cc. and which had been diluted to a consistency of 1.0 weight percent based on oven dry pulp. The cationic dispersion was added in an amount of 1.0 weight percent solids based on oven dry pulp. Handsheets having a basis weight of 40 lbs. for 500 sheets 24 x 36 in. were prepared from this pulp on standard equipment, such as a Noble and Wood handsheet machine. These handsheets were conditioned at 21°–23° C. for 24 hours at 50±3 percent relative humidity. Test strips cut from these handsheets were then soaked in water at room temperature for 5 minutes and the wet tensile strength was measured by well-known techniques. The test procedure is described in TAPPI standard T456 m-49. The wet tensile strength was 8.5 lbs./in. of width. Handsheets having the same basis weight but containing none of the cationic dispersion had wet tensile strength values of only about 1.76 lbs./in. of width. Tap water can also be used for forming the dispersion without affecting the tensile strength of the resulting treated paper.

*Example III*

Handsheets were prepared according to the procedures of Example II above. Test strips cut from these handsheets were then tested for dry tensile strength according to TAPPI standard T404 os-61. Handsheets containing the cationic dispersion had dry tensile strength of 29.2 lbs./in. width while handsheets which did not contain the cationized dispersion had dry tensile strength of only 24.6 lbs./in. width.

What is claimed is:

1. A composition dispersible in water at room temperature comprising the finely-divided solidified reaction product of from about 70 to about 85 parts by weight dialdehyde polysaccharides wherein from about 0.5 to about 100 units out of 100 of the original anhydroglucose units of the polysaccharides have been oxidized to dialdehyde units represented by the formula:

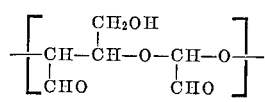

from about 7.5 to about 15 parts by weight hypochlorite oxidized polysaccharides, and from about 7.5 to about 15 parts by weight of a condensation product of dicyandiamide and formaldehyde.

2. A composition dispersible in water at room temperature comprising the finely-divided solidified reaction product of about 70 parts by weight dialdehyde polysaccharides wherein from about 0.5 to about 100 units out of 100 of the original anhydroglucose units of the polysaccharides have been oxidized to dialdehyde units represented by the formula:

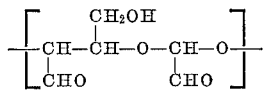

about 15 parts by weight hypochlorite oxidized polysaccharides, and about 15 parts by weight of a condensation product of dicyandiamide and formaldehyde.

3. A composition dispersible in water at room temperature comprising the finely-divided solidified reaction product of from about 70 to about 85 parts by weight dialdehyde polysaccharides wherein from about 90 to about 100 units out of 100 of the original anhydroglucose units of the polysaccharides have been oxidized to dialdehyde units represented by the formula:

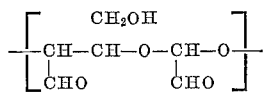

from about 7.5 to about 15 parts by weight hypochlorite oxidized polysaccharides, and from about 7.5 to about 15 parts by weight of a condensation product of dicyandiamide and formaldehyde.

4. A composition dispersible in water at room temperature comprising the finely-divided spray-dried reaction product of about 70 parts by weight dialdehyde polysaccharides wherein from about 90 to about 100 units out of 100 of the original anhydroglucose units of the polysaccharides have been oxidized to dialdehyde units represented by the formula:

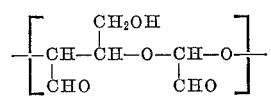

about 15 parts by weight hypochlorite oxidized polysaccharides, and about 15 parts by weight of a condensation product of dicyandiamide and formaldehyde.

5. A process for preparing a composition dispersible in water at room temperature which comprises mixing in water from about 70 to about 85 parts by weight dialdehyde polysaccharides, from about 7.5 to about 15 parts by weight hypochlorite oxidized polysaccharides and from about 7.5 to about 15 parts by weight of a condensation product of dicyandiamide and formaldehyde to form a slurry containing about 15–25 weight percent solids, reacting the non-aqueous constituents of the slurry with each other by heating the slurry with stirring to about 90°–100° C. for about 5–15 minutes until the dispersion of the solid material is complete, cooling the dispersion to about 70° C., adjusting the pH of the dispersion to about 4–5.5 and then drying the dispersion and collecting the finely-divided solidified product.

6. A process as claimed in claim 5 wherein the pH of the dispersion is adjusted to 4.3–4.5 before drying.

7. A process as claimed in claim 5 wherein the dispersion is dried by spray drying.

8. A process as claimed in claim 5 wherein about 70 parts by weight dialdehyde polysaccharides are mixed with about 15 parts by weight hypochlorite oxidized polysaccharides and about 15 parts by weight of a condensation product of dicyandiamide and formaldehyde.

9. A process as claimed in claim 5 wherein the dispersion temperature is about 95°–97° C.

10. A process for preparing a composition dispersible in water at room temperature which comprises mixing in water about 70 parts by weight dialdehyde polysaccharides, about 15 parts by weight hypochlorite oxidized polysaccharides and about 15 parts by weight of a condensation product of dicyandiamide and formaldehyde to form a slurry containing about 15–25 weight percent solids, reacting the non-aqueous constituents of the slurry with each other by heating the slurry with stirring to about 95°–97° C. for about 5–15 minutes until the dispersion of the solid material is complete, cooling the dispersion to about 70° C., adjusting the pH of the dispersion to about 4.3–4.5 and then spray drying and collecting the finely-divided dried solidified product.

References Cited by the Examiner
UNITED STATES PATENTS

| | | | |
|---|---|---|---|
| 2,685,508 | 8/1954 | Spear | 26—209 |
| 2,730,505 | 1/1956 | Jordan | 260—209 |
| 2,819,260 | 1/1958 | Monson et al. | 260—209 |
| 2,948,652 | 8/1960 | Jen et al. | 162—166 |
| 2,956,963 | 10/1960 | Baird | 260—209 |
| 3,021,329 | 2/1962 | Borchert | 260—249.6 |
| 3,033,743 | 5/1962 | Moore et al. | 162—166 |
| 3,042,666 | 7/1962 | Gentles | 260—209 |

LEWIS GOTTS, *Primary Examiner.*

CHARLES B. PARKER, *Examiner.*